US011414083B2

(12) United States Patent
Berghöfer et al.

(10) Patent No.: US 11,414,083 B2
(45) Date of Patent: Aug. 16, 2022

(54) METHOD AND SYSTEM FOR AVOIDING LATERAL COLLISIONS

(71) Applicant: Continental Teves AG & Co. oHG, Frankfurt (DE)

(72) Inventors: Yannick Berghöfer, Frankfurt am Main (DE); Ahmed Boughaleb Hassani, Darmstadt (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 54 days.

(21) Appl. No.: 16/906,273

(22) Filed: Jun. 19, 2020

(65) Prior Publication Data
US 2020/0317199 A1 Oct. 8, 2020

Related U.S. Application Data

(63) Continuation of application No. PCT/DE2018/200101, filed on Nov. 8, 2018.

(51) Int. Cl.
*B60W 40/04* (2006.01)
*B60W 60/00* (2020.01)
(Continued)

(52) U.S. Cl.
CPC ............ *B60W 40/04* (2013.01); *B60W 30/09* (2013.01); *B60W 30/0956* (2013.01);
(Continued)

(58) Field of Classification Search
CPC ............ B60W 30/09; B60W 30/0956; B60W 30/18163; B60W 40/04; B60W 60/0016; B60W 2554/4041; B60W 2554/4048
See application file for complete search history.

(56) References Cited

U.S. PATENT DOCUMENTS 6,650,984 B1 * 11/2003 Rao .................... B60R 21/0132
342/72
6,674,394 B1 * 1/2004 Zoratti .................... B60T 7/16
342/70
(Continued)

FOREIGN PATENT DOCUMENTS

CN 103155014 A * 6/2013 ............. G08G 1/161
DE 102005008266 A1 8/2006
(Continued)

OTHER PUBLICATIONS

International Search Report and Written Opinion dated Mar. 27, 2018 from corresponding International Patent Application No. PCT/DE2018/200101.
(Continued)

*Primary Examiner* — Angelina Shudy

(57) ABSTRACT

A method for avoiding a lateral collision of an ego vehicle includes monitoring a lateral area of the ego vehicle, the monitored area subdivided into at least two subareas and the subareas are at least one pre-warning area and a trigger area. The method also includes identifying a target vehicle in the pre-warning and trigger area, determining movement parameters of the ego vehicle and of the target vehicle. The ego vehicle is controlled in such a way that the distance from the target vehicle is increased. Further, the ego vehicle is controlled as a function of a residence time of the target vehicle in the pre-warning area and in the trigger area, wherein the monitored subareas are located on the lane neighboring the lane used by the ego vehicle and/or a lane adjacent to the neighboring lane.

9 Claims, 2 Drawing Sheets

(51) Int. Cl.
  *B60W 30/09* (2012.01)
  *B60W 30/095* (2012.01)
  *B60W 30/18* (2012.01)

(52) U.S. Cl.
  CPC .. *B60W 30/18163* (2013.01); *B60W 60/0016* (2020.02); *B60W 2554/4041* (2020.02); *B60W 2554/4048* (2020.02)

(56) References Cited

U.S. PATENT DOCUMENTS

| | | | | |
|---|---|---|---|---|
| 7,826,970 | B2* | 11/2010 | Kobayashi | B60W 40/09 |
| | | | | 701/300 |
| 8,655,579 | B2* | 2/2014 | Sakugawa | G08G 1/166 |
| | | | | 701/301 |
| 9,272,710 | B2 | 3/2016 | Jeon et al. | |
| 9,437,111 | B2* | 9/2016 | Ignaczak | G08B 25/08 |
| 9,576,492 | B2 | 2/2017 | Rosen et al. | |
| 9,691,282 | B2* | 6/2017 | Hartmann | B60W 30/0956 |
| 10,661,793 | B2* | 5/2020 | Minemura | G08G 1/16 |
| 10,787,170 | B2* | 9/2020 | Minemura | B60T 7/12 |
| 11,086,011 | B2* | 8/2021 | Sakai | G01S 13/93 |
| 2002/0005778 | A1* | 1/2002 | Breed | G01S 7/481 |
| | | | | 340/435 |
| 2005/0073438 | A1* | 4/2005 | Rodgers | G08G 1/161 |
| | | | | 340/944 |
| 2007/0104252 | A1* | 5/2007 | Jang | H04L 27/0014 |
| | | | | 375/147 |
| 2008/0040040 | A1* | 2/2008 | Goto | G05D 1/024 |
| | | | | 701/301 |
| 2008/0252482 | A1* | 10/2008 | Stopczynski | G08G 1/166 |
| | | | | 340/903 |
| 2009/0088925 | A1* | 4/2009 | Sugawara | B60W 30/12 |
| | | | | 701/41 |
| 2014/0037138 | A1* | 2/2014 | Sato | G06K 9/00805 |
| | | | | 382/103 |
| 2014/0071282 | A1* | 3/2014 | Murad | G08G 1/167 |
| | | | | 348/148 |
| 2014/0203925 | A1* | 7/2014 | Augst | G08G 1/16 |
| | | | | 340/435 |
| 2014/0244114 | A1* | 8/2014 | Matsubara | B60W 30/0956 |
| | | | | 701/41 |
| 2015/0149037 | A1* | 5/2015 | Lim | B60W 40/105 |
| | | | | 701/41 |
| 2015/0153735 | A1* | 6/2015 | Clarke | B62D 15/025 |
| | | | | 701/301 |
| 2015/0307093 | A1* | 10/2015 | Sasabuchi | B60W 30/0956 |
| | | | | 701/1 |
| 2016/0023598 | A1* | 1/2016 | Kohler | G01S 13/931 |
| | | | | 340/435 |
| 2016/0112846 | A1* | 4/2016 | Siswick | H04W 4/40 |
| | | | | 455/456.4 |
| 2016/0137199 | A1* | 5/2016 | Kuh | B60W 30/09 |
| | | | | 701/41 |
| 2016/0328963 | A1* | 11/2016 | Yao | G08G 1/0133 |
| 2016/0362104 | A1* | 12/2016 | Miller | B60W 30/08 |
| 2018/0148051 | A1* | 5/2018 | Lujan | G05D 1/0214 |
| 2018/0151073 | A1* | 5/2018 | Minemura | G01S 13/931 |
| 2018/0174462 | A1* | 6/2018 | Um | B60W 30/12 |
| 2018/0297591 | A1* | 10/2018 | Minemura | B60W 50/14 |
| 2018/0312163 | A1* | 11/2018 | Minemura | B60T 7/22 |
| 2018/0326981 | A1* | 11/2018 | Nakamura | B60W 10/04 |
| 2018/0336787 | A1* | 11/2018 | Ohnishi | G01S 17/931 |
| 2018/0354519 | A1* | 12/2018 | Miyata | B60W 10/20 |
| 2018/0366002 | A1* | 12/2018 | Rothmund | G08G 1/165 |
| 2019/0039624 | A1* | 2/2019 | Ike | B60W 50/0098 |
| 2019/0073906 | A1* | 3/2019 | Matsunaga | B60W 50/0097 |
| 2019/0135278 | A1* | 5/2019 | Hillman | B60W 30/09 |
| 2019/0225266 | A1* | 7/2019 | Enomoto | G06T 7/13 |
| 2019/0291732 | A1* | 9/2019 | Fiaschetti | B62D 15/029 |
| 2019/0315345 | A1* | 10/2019 | Newman | B60W 50/14 |
| 2019/0333386 | A1* | 10/2019 | Horita | B60W 30/0956 |
| 2019/0359218 | A1* | 11/2019 | Pohl | G01S 13/931 |
| 2020/0062277 | A1* | 2/2020 | Kim | G08G 1/166 |
| 2020/0180637 | A1* | 6/2020 | Oh | G01S 13/931 |
| 2020/0231170 | A1* | 7/2020 | Grelaud | B60W 30/18163 |
| 2020/0255003 | A1* | 8/2020 | Fujii | B60W 30/0953 |
| 2020/0398848 | A1* | 12/2020 | Singh | G08G 1/167 |
| 2021/0031762 | A1* | 2/2021 | Matsunaga | G08G 1/16 |
| 2021/0122373 | A1* | 4/2021 | Dax | G08G 1/166 |
| 2021/0291868 | A1* | 9/2021 | Okuda | B60W 40/107 |

FOREIGN PATENT DOCUMENTS

| | | |
|---|---|---|
| DE | 102006010275 A1 | 12/2006 |
| DE | 102010029780 A1 | 12/2011 |
| DE | 102012215014 A1 | 2/2014 |
| DE | 102012025064 A1 | 6/2014 |
| DE | 102013010983 A1 | 1/2015 |
| DE | 102014116225 A1 | 9/2015 |
| DE | 102016202830 A1 | 8/2017 |
| DE | 112014007205 T5 | 8/2017 |
| EP | 2936197 A1 | 10/2015 |
| WO | 2017065158 A1 | 4/2017 |
| WO | 2017065212 A1 | 4/2017 |

OTHER PUBLICATIONS

German Search Report dated Jun. 13, 2018 for corresponding German Patent Application No. 10 2017 223 486.5.

* cited by examiner

METHOD AND SYSTEM FOR AVOIDING LATERAL COLLISIONS

CROSS REFERENCE TO RELATED APPLICATION

This application is a continuation of International application No. PCT/DE2018/200101, filed Nov. 8, 2018, which claim priority to German patent application No. 10 2017 223 486.5, filed Dec. 21, 2017, each of which is hereby incorporated by reference.

TECHNICAL FIELD

The technical field relates to avoiding a lateral collision of an ego vehicle.

BACKGROUND

Methods which monitor the immediate lateral and rear space and, if necessary, output a warning are known from the prior art. Such methods are also commonly referred to as Avoidance of Lateral Collision (AoLC) functions.

For example, WO2014/095104A1 discloses a method which monitors a rear area and an area next to the vehicle by means of radar. A warning signal is output to the driver if a vehicle enters the rear area or respectively warning area. The second area, which is arranged right next to the vehicle, serves to monitor the course of the detected vehicle. The warning signal is maintained until such time as the detected vehicle leaves the area next to the vehicle. A method which monitors a lateral, rear space is further known from DE102006010275A1.

One disadvantage of the previous prior art is that incorrectly identified object attributes of the target vehicle such as, for example, the lateral or longitudinal speed of the target vehicle, can lead to incorrect interventions. This reduces the quality and sophistication of such methods.

As such, it is desirable to present collision monitoring on the basis of suitable measures in order to obtain an AoLC function which has the highest possible level of sophistication. In addition, other desirable features and characteristics will become apparent from the subsequent summary and detailed description, and the appended claims, taken in conjunction with the accompanying drawings and this background.

SUMMARY

In addition to subdividing the monitored area, a temporal aspect with respect to the detection of a target vehicle has to be taken into consideration if the ego vehicle is to be directly controlled. This is because triggering a control of the ego vehicle, both too early and too late, represents a huge risk. Furthermore, the subdivided areas should differ at least partially in their significance. For a simple output of a warning message, as also described in the prior art, the temporal aspect is not relevant to the extent that the driver makes a decision himself, based on the information, as to whether an intervention is necessary and, after having been made aware of a potential risk, he continues to observe said risk himself. Furthermore, it was established in terms of the area to be monitored that it may be necessary to not only monitor the lane immediately adjacent but also the lane adjacent to the neighboring lane.

Accordingly, a method for avoiding a lateral collision of an ego vehicle is described herein. In one embodiment, a lateral area of the ego vehicle is monitored, wherein the monitored area is subdivided into at least two subareas and the subareas are at least one pre-warning area and a trigger area. If a target vehicle is identified in the pre-warning and trigger area, movement parameters of the ego vehicle and of the target vehicle are then determined. The ego vehicle can subsequently be controlled in such a way that the distance from the target vehicle is increased. The ego vehicle is controlled as a function of a residence time of the target vehicle in the pre-warning area and in the trigger area, wherein the monitored subareas are located on the lane neighboring the lane used by the ego vehicle and/or the lane adjacent to the neighboring lane.

The trigger area denotes a narrow geometric area in which the target vehicle has to be located so that the relative relationship between the ego vehicle and target vehicle is able to trigger a lateral regulating intervention. The trigger area may overlap geometrically with the pre-warning area. The minimum time that the target vehicle has remained in the trigger area is additionally relevant.

In contrast to the trigger area, the pre-warning area is a wider geometric area in which the target vehicle has to have been located prior to entering the trigger area, so that the target vehicle may be considered a relevant object in the trigger area. The pre-warning area ensures that the target vehicle has not suddenly appeared in the trigger area, which could happen for example due to incorrect sensor data.

In the case of the method according to the invention, it is advantageous that the monitored area is divided up into at least two different areas and a target vehicle must have been in each of the areas for at least a certain period of time in order to trigger a regulating intervention. Furthermore, a regulating intervention is not triggered until the target vehicle is located in the trigger area. In this way, it is prevented that a regulating intervention is triggered too soon. The term 'regulating intervention' in this context describes the control of the ego vehicle.

In one embodiment, the subareas are in each case constant and/or are in each case adaptively adjusted in terms of their spatial localization.

In a further embodiment, the subareas are adaptively adjusted on the basis of the ego vehicle speed, a lateral ego vehicle speed, a lane width, a lane width of a neighboring lane or a distance of the ego vehicle from the lane marking. An adaptive adjustment of the subareas is advantageous in this regard since, for example, if the lane with constant subareas is widened, a target vehicle might possibly be detected too late.

In one embodiment, the subareas are located on the lane adjacent to the neighboring lane if the neighboring lane is free and an intention of the ego vehicle to change lanes is established. If a vehicle is already identified on the neighboring lane, a lane change is not possible, such that the lane change process would be aborted for example. If no vehicle is identified on the neighboring lane, a lane change is possible. However, in the case of an at least three-lane road, this means that a further lane would have to be monitored, if a change is to be made from the far right lane to the middle lane, as otherwise a vehicle which likewise wishes to make a lane change from the far left lane to the middle lane could be overlooked.

When a vehicle is identified in the pre-warning and/or the trigger area on the lane adjacent to the neighboring lane, an intention of the target vehicle to change lanes is therefore preferably detected. If a vehicle is identified on the lane adjacent to the neighboring lane, it is necessary to determine whether the vehicle is intending to change to the same lane as the ego vehicle. If an intention of the target vehicle to change lanes is established, the lane change process of the ego vehicle can be aborted in order to avoid a collision. It would likewise be possible to accelerate the ego vehicle, provided that the permitted speed limit is not exceeded, and to perform the lane change such that it is ensured that the ego vehicle is a sufficient distance from the target vehicle during a simultaneous lane change. In order to establish the intention to change lanes of the target vehicle, the lateral acceleration of the target vehicle can be determined.

The movement parameters may comprise a vehicle speed and/or a vehicle acceleration.

In one embodiment, the control of the ego vehicle comprises an acceleration, a braking operation, and/or a steering intervention. Depending on the situation, the vehicle is accordingly controlled in order to increase the distance from the target vehicle in order to consequently avoid a collision.

According to one embodiment, a system for performing the method according described herein is furthermore proposed, wherein the system has an acquisition device for acquiring and providing data of the monitoring area, a control device for controlling the vehicle and a data processing device for evaluating the data.

The acquisition device may comprise at least one camera and/or at least one radar sensor. A target vehicle can advantageously be detected in the environment of the vehicle by means of a radar sensor. Both a target vehicle can be detected by means of a camera and an intention to change lanes can be detected, for example, by means of an identification of an active turn indicator.

The data processing device may include an algorithm, by means of which the data of the acquisition device can be evaluated. The algorithm decides, on the basis of conditions which are met or not met, whether a regulating intervention, that is to say a control of the ego vehicle, is necessary. The conditions which have to be met for a control comprise inter alia that the target vehicle must have been located in the pre-warning area and in the trigger area for a certain minimum time. Furthermore, certain conditions of the ego vehicle have to be met. By way of example, the speed or the acceleration of the ego vehicle must have a specific value. During a planned lane change of the ego vehicle, the lane change of the ego vehicle and of the target vehicle must furthermore be met as a condition. If all of the necessary conditions are met, the data processing device issues an order to the control device to trigger a regulating intervention.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
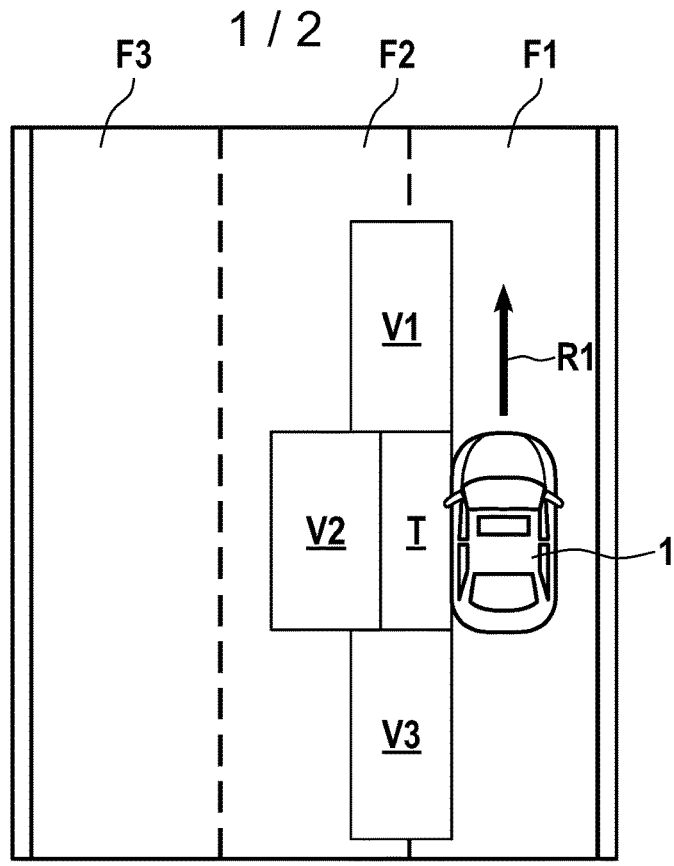
FIG. 1 shows a schematic depiction of a vehicle with a monitoring area.

FIG. 1 shows a schematic depiction of a vehicle 1 with a monitoring area. The vehicle 1, which constitutes the ego vehicle 1 within the meaning of the disclosure, is moving in the direction R1 on the lane F1. Here, the monitoring area is subdivided into three pre-warning areas V1, V2, V3 and a trigger area T, wherein fewer or more than three pre-warning areas would also be conceivable. These are located, in the case shown, to the left of the ego vehicle 1 on the neighboring lane F2. Furthermore, a third lane F3 is shown. The monitoring area is shown here, by way of example, on the left side. The system is admittedly configured in such a way that a monitoring area is present on both sides. In this way, it is ensured that the vehicle environment can be reliably acquired and monitored in any situation. The areas have a rectangular configuration in this depiction. However, other geometrical forms such as, for example, semicircles would also be possible.

Figure 2:
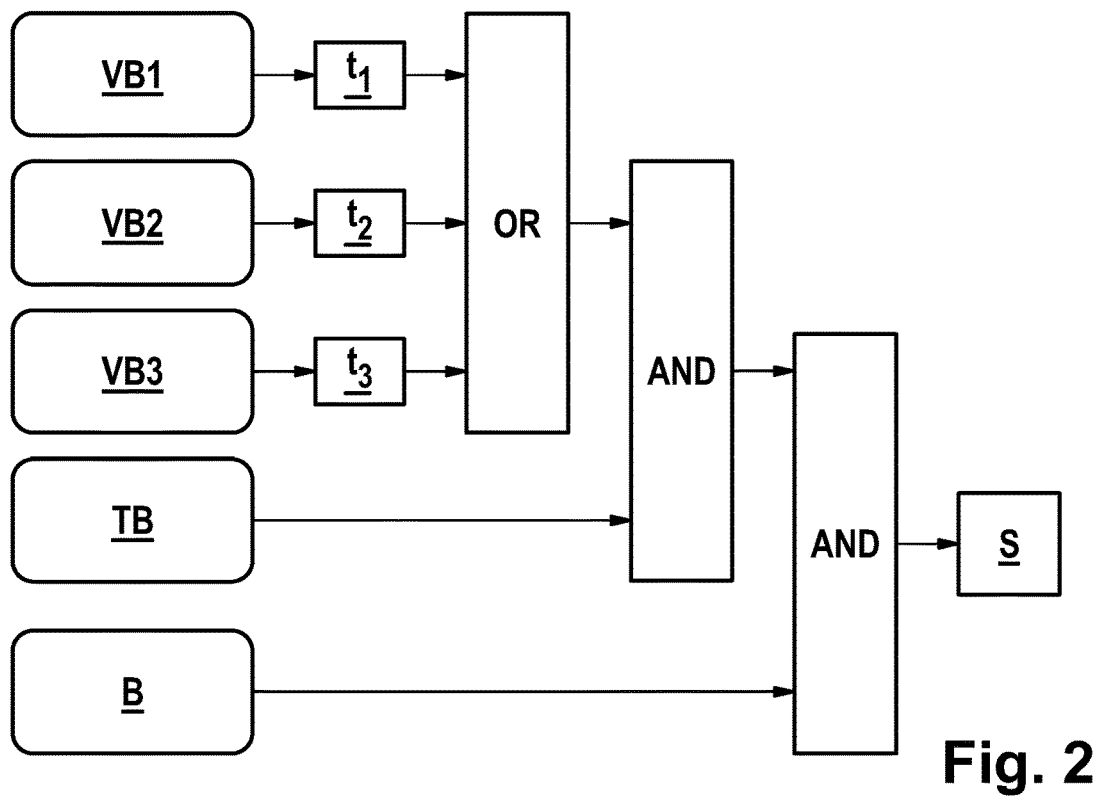
FIG. 2 shows a schematic flow chart of an algorithm for evaluating data.

FIG. 2 shows a schematic flow chart of an algorithm for evaluating data. In this embodiment, it is checked by means of the algorithm whether certain conditions are met and whether a control S or respectively a regulating intervention has to be performed. In order to trigger a control S of the ego vehicle 1, a target vehicle 2 has to meet one of the pre-warning area conditions VB1-VB3 for a specified minimum time t1-t3. This means a target vehicle 2 must have been located in one of the pre-warning areas V1-V3 shown, for example, in FIG. 1 for a specific period of time t1-t3. It is furthermore necessary that the target vehicle 2 meets a trigger area condition TB. In this embodiment, the target vehicle 2 must have been located in the trigger area T. In order that at least one of the pre-warning area conditions VB1-VB3 is met, further conditions can be set in addition to the position and the minimum time of the target vehicle 2 in the pre-warning area V1-V3. These comprise the minimum and maximum longitudinal and lateral relative speed of the target vehicle 2. Furthermore, each pre-warning area V1-V3 can set independent and specific conditions. Any conditions can be situationally and adaptively designed. In order to meet the trigger area condition TB, the minimum and maximum longitudinal and lateral relative speed of the target vehicle 2 can likewise be set as a condition.

Further, specific conditions B have to additionally be met. These can comprise a specific speed of the ego vehicle 1 and/or of the target vehicle 2 or a specific lateral acceleration of the ego vehicle 1 and/or of the target vehicle 2. If all of these conditions are met simultaneously, a control S of the vehicle is prompted by means of the algorithm.

Figure 3:
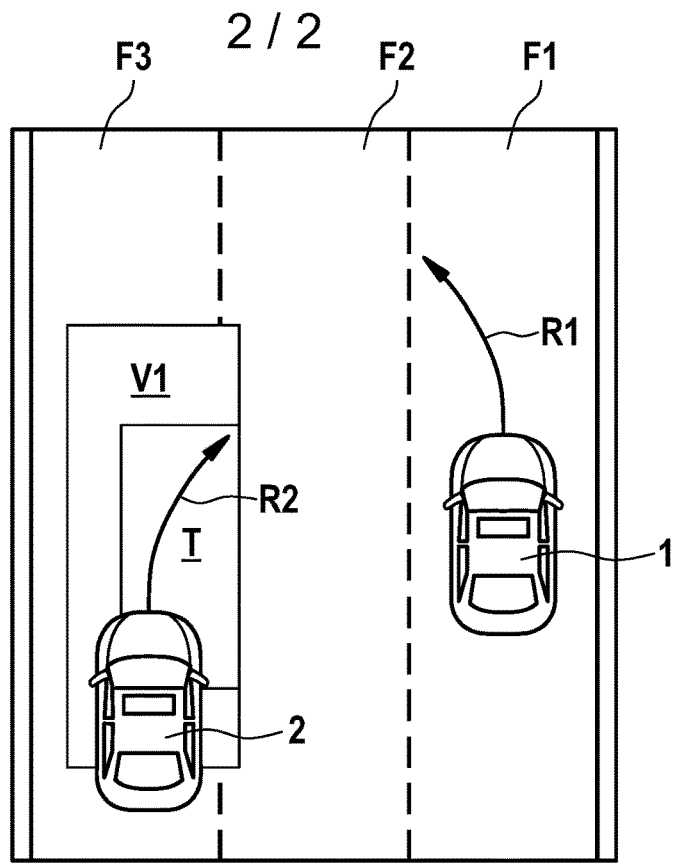
FIG. 3 shows a schematic depiction of a vehicle and of a target vehicle intending to change lanes.

FIG. 3 shows a schematic depiction of a vehicle 1 and of a target vehicle 2 intending to change lanes. The ego vehicle 1 is, in this embodiment, moving in a direction R1 which guides the ego vehicle 1 in the direction of the lane F2. The target vehicle 2 is moving in the direction R2 and likewise on the lane F2. Due to the intention of the ego vehicle 1 to change lanes, the monitoring area is located on the third lane F3. The target vehicle 2 then enters the pre-warning area V and the trigger area T. The ego vehicle 1 can subsequently be controlled by an appropriate regulating intervention, in order to avoid a collision.

Figure 4:
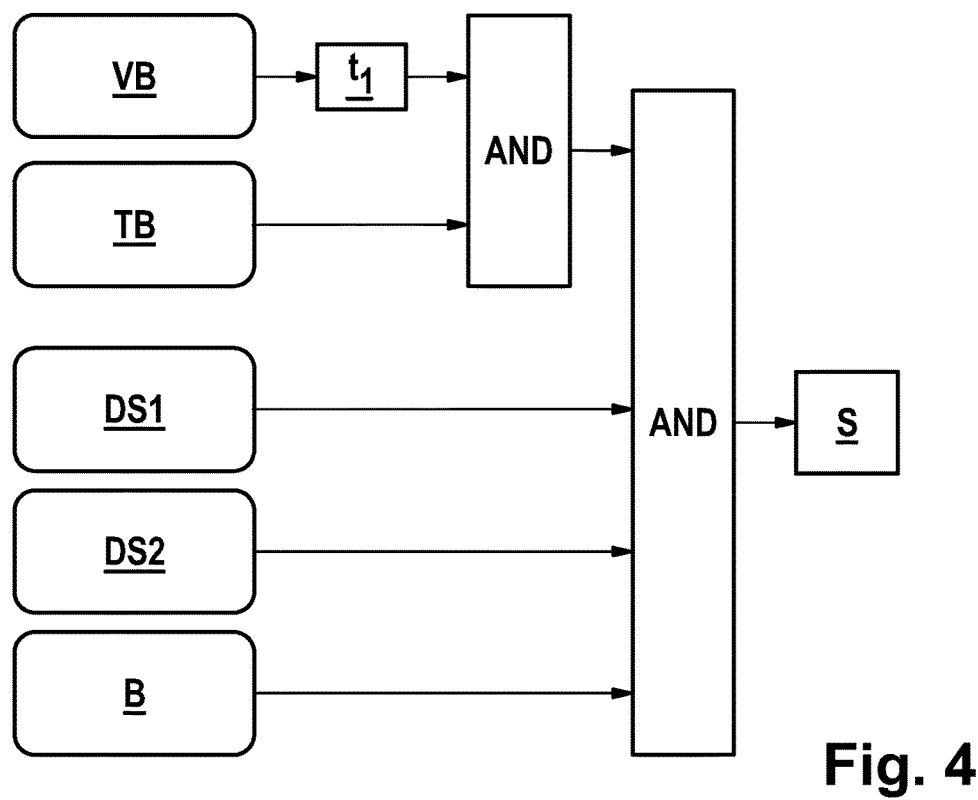
FIG. 4 shows a further schematic flow chart of an algorithm for evaluating data.

FIG. 4 shows a further schematic flow chart of an algorithm for evaluating data. In addition to the pre-warning area condition VB and the trigger area condition TB, the condition of the detection of a lane change DS1 of the ego vehicle 1 and the condition of the detection of a lane change DS2 of the target vehicle 2 must be met in this case. Likewise, as already explained with regard to FIG. 2, further specific conditions B have to be met in order to trigger a control or respectively a regulating intervention S.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

LIST OF REFERENCE NUMERALS

1 Ego vehicle
2 Target vehicle
B Other conditions
DS1 Detection of intention of ego vehicle to change lanes
DS2 Detection of intention of target vehicle to change lanes
F1-F3 Lanes
R1 Direction of movement of ego vehicle
R2 Direction of movement of target vehicle
S Control/regulating intervention
T Trigger area
TB Trigger area condition
$t_1$-$t_3$ Minimum time in a pre-warning area
V1-V3 Pre-warning areas
VB1-VB3 Pre-warning area conditions

What is claimed is:

1. A method for avoiding a lateral collision of an ego vehicle, comprising:
monitoring a lateral area of the ego vehicle;
subdividing the monitored lateral area into at least two subareas with the subareas including a pre-warning area and a trigger area;
identifying a target vehicle in the pre-warning area and the trigger area;
determining movement parameters of the ego vehicle and of the target vehicle in response to the target vehicle being identified in the pre-warning area and the trigger area;
controlling the ego vehicle to increase a distance from the target vehicle as a function of a residence time of the target vehicle in the pre-warning area and in the trigger area, wherein the subareas are located on a neighboring lane adjacent a lane used by the ego vehicle and/or a third lane adjacent to the neighboring lane.

2. The method according to claim 1, wherein each subarea has a spatial localization which is constant.

3. The method according to claim 1, wherein each subarea has a spatial localization which is adjusted.

4. The method according to claim 3, wherein the spatial localization of the subareas is adjusted on the basis of an ego vehicle speed, a lateral ego vehicle speed, a lane width, a lane width of a neighboring lane, a distance of the ego vehicle from the lane marking, and an intention of the ego vehicle to change lanes.

5. The method according to claim 1, wherein the subareas are located on the lane adjacent to the neighboring lane, if the neighboring lane is free and an intention of the ego vehicle to change lanes is established.

6. The method according to claim 5, wherein an intention of the target vehicle to change lanes is established in response to the target vehicle being identified in the pre-warning area and/or the trigger area on the lane adjacent to the neighboring lane.

7. The method according to claim 1, wherein the movement parameters comprise at least one of a vehicle speed and a vehicle acceleration.

8. The method according to claim 1, wherein the control of the ego vehicle comprises at least one of an acceleration, a braking operation, and a steering intervention.

9. A system for avoiding a lateral collision of an ego vehicle, comprising:
an acquisition device configured to monitor a lateral area of the ego vehicle;
a data processing device configured to evaluate the data, including
subdividing the monitored lateral area into at least two subareas with the subareas including a pre-warning area and a trigger area, wherein the monitored subareas are located on a neighboring lane adjacent a lane used by the ego vehicle and/or a third lane adjacent to the neighboring lane,
identifying a target vehicle in the pre-warning area and the trigger area, and
determining movement parameters of the ego vehicle and of the target vehicle in response to the target vehicle being identified in the pre-warning area and the trigger area; and
a control device configured to control the ego vehicle to increase a distance from the target vehicle as a function of a residence time of the target vehicle in the pre-warning area and in the trigger area.

* * * * *

UNITED STATES PATENT AND TRADEMARK OFFICE
CERTIFICATE OF CORRECTION

| | | |
|---|---|---|
| PATENT NO. | : 11,414,083 B2 | |
| APPLICATION NO. | : 16/906273 | |
| DATED | : August 16, 2022 | |
| INVENTOR(S) | : Yannick Berghöfer and Ahmed Boughaleb Hassani | |

It is certified that error appears in the above-identified patent and that said Letters Patent is hereby corrected as shown below:

On the Title Page

After Item (63), please add the following:
(30) Foreign Application Priority Data
December 21, 2017 (DE) 10 2017 223 486.5

Signed and Sealed this
Nineteenth Day of December, 2023

Katherine Kelly Vidal
*Director of the United States Patent and Trademark Office*